United States Patent [19]

Burba, III

[11] Patent Number: 4,748,139

[45] Date of Patent: May 31, 1988

[54] PREPARATION OF PRECURSOR MATERIALS CONVERTIBLE INTO BI- AND POLY-METAL SPINELS

[75] Inventor: John L. Burba, III, Angleton, Tex.

[73] Assignee: The Dow Chemical Company, Midland, Mich.

[21] Appl. No.: 869,521

[22] Filed: Jun. 2, 1986

[51] Int. Cl.$^4$ .................. C04B 35/04; C01F 35/16
[52] U.S. Cl. .................................... 501/120; 423/599; 423/600
[58] Field of Search ............... 501/117, 120, 126, 127; 423/600, 599, 593

[56] References Cited

U.S. PATENT DOCUMENTS

| | | | |
|---|---|---|---|
| 3,300,277 | 1/1967 | Schenck | 423/600 |
| 4,400,431 | 8/1983 | Henslee et al. | 501/120 X |
| 4,459,156 | 7/1984 | Henslee et al. | 501/120 X |
| 4,492,677 | 1/1985 | Yoo et al. | 501/120 X |
| 4,492,678 | 1/1985 | Yoo et al. | 501/120 X |

FOREIGN PATENT DOCUMENTS

| | | | |
|---|---|---|---|
| 3319346 | 6/1984 | Fed. Rep. of Germany | 501/120 |
| 1011602 | 4/1983 | U.S.S.R. | 501/120 |

Primary Examiner—William R. Dixon, Jr.
Assistant Examiner—James M. Hunter, Jr.
Attorney, Agent, or Firm—D. Gunn; G. R. Baker; W. J. Lee

[57] ABSTRACT

A method of producing layered structures of metal hydroxides (one or more metals) free of chloride or chlorine is disclosed. A specific ratio layered structure hydroxide is obtained from mixing first and second metals (respectively in the form of hydroxide, oxyhydroxide carbonate or nitrate as to the first metal and a hydroxide or alkali metal oxide as to the second) in proportions yielding a precipitated layered structure. The precipitators metal hydroxides with any excess of metal over 1:1 forming a segregated phase. Processing involves mixing, maintaining as a suspension up to about 48 hours at temperatures above about 40° C. followed by cooling to recover the precipitate.

11 Claims, No Drawings

PREPARATION OF PRECURSOR MATERIALS CONVERTIBLE INTO BI- AND POLY-METAL SPINELS

CROSS-REFERENCE TO RELATED APPLICATIONS

This application is related to my co-pending application entitled "MIXED METAL HYDROXIDE-CLAY ADDUCTS AS THICKENERS FOR WATER AND OTHER HYDROPHILIC FLUIDS" Ser. No. 752,326, filed by John L. Burba and Audrey L. Barnes, now U.S. Pat. No. 4,664,843 and continuation application thereof Ser. No. 047,800 filed May 7, 1987; and my application entitled "MIXED METAL HYDROXIDES FOR THICKENING WATER OR HYDROPHILIC FLUIDS" Ser. No. 752,325, filed July 5, 1985, now abandoned, and continuation application thereof Ser. No. 060,133, filed June 9, 1987, both by John L. Burba and Greene W. Strother.

BACKGROUND OF THE INVENTION

The ceramic industry has long known and used spinels, e.g., magnesium aluminate ($MgAl_2O_3$), both naturally occurring as well as the synthetic spinels, because these materials have high temperature stability. Most of the synthetic spinels have been prepared via the fusion route from mixtures of their respective oxides. These materials as well as the naturally occurring spinels must be ground and formed with the aid of binders since they have little or no reactivity, ability to bond to themselves through crystal reorientation and/or densification, remaining. Therefore, it is necessary to mix the crushed ground or powdered spinel with binders, most of which are changed in chemical structure when the mixture of the spinel and binder is heated to form the final product. In addition, most natural and synthetic spinels contain one or the other of the metals in slight excess, forming a segregated phase among the spinel crystals. The presence of such phases weakens the spinel through disruption of the ordered crystalline structure.

Recently, several patents have issued which provide a means to produce, at low temperatures, precursor compositions which are convertible to their respective spinels in nearly the theoretical ratio of metals, one to the other, which process provides a spinel structure having a considerable amount of reactivity and ability to densify on heating. The unique characteristics of the precursors and their respective low temperature converted oxide forms permit the formation of many products without the aid of binders, and even when a binder is used, the reactivity of the oxide form heated to no higher than about 1200° to 1500° C. prior to final thermal processing, e.g., above 1500° C., produces superior products. The technique described in these patents is to co-precipitate the water soluble salts of the desired metals to form a precursor which is a layered structure of a 1 to 1 ratio of the metal hydroxides, oxyhydroxides, carbonates, nitrates or mixtures thereof with sufficient segregated hydroxide or oxyhydroxide or mixtures of the compounds of the major metal to provide the theoretical spinel ratio of the metals one to the other, e.g., $MgAl_2O_4$. However, most of the techniques taught for such precursor formation have chloride in some small amounts which has been found to create a corrosion problem in some applications.

It would therefore be advantageous to have a process for the preparation of the precursor which avoids the inclusion of, or the use of, any chlorine containing ingredient, including water containing any chlorides.

BRIEF DESCRIPTION OF THE INVENTION

In accordance with the present invention, it has now been found that a halogen free (substantially free of halogen ion) bi- or poly-metal precursor suitable for use as a thickening agent for hydrophilic fluids as well as for preparing spinels, when the metals are mixed in the proper ratios, can be prepared by dissolving and/or suspending a mixture of a first or group of first metal hydroxide, oxide or carbonate which is at least partially soluble under alkaline conditions and an alkali metal metal-oxide or hydroxide, similarly at least partially soluble under alkaline conditions, e.g., magnesium hydroxide and sodium aluminate, in proportions to yield, on precipitation after digestion under alkaline conditions, a precursor composition which is a layered structure of the metals in a ratio of 1 to 1 and a segregated phase of the metal in excess of the 1 to 1 ratio, e.g., from about 0 to about 3 ratios present in the original mixture of starting materials. When there is present a segregated phase, to the extent it is present up to a ratio of 1 to 1 with the layered structure, the composition is capable of forming on heating to about 300° C. an oxide spinel structure which on further heating is densifiable to a spinel structure which has no chloride or chlorine content, and, thus, is not corrosive, being substantially free of chlorine or chloride, during use and of course, no chlorine is released during oxide formation or during densification. Thus, one can prepare chlorine free precursor compositions which are useful in their own right as well as convertible to densified oxide and/or spinel structures.

The crux of the discovery is illustrated in the digestion of a suspension of a metal hydroxide, e.g., magnesium hydroxide, and an alkali metal metal-oxide, e.g., sodium aluminate, in proportions to yield on precipitation, at the pH at which all the resultant component metal hydroxides co-precipitate, a composition which is of a layered structure of the two or more metals and if one or more is present in excess of this ratio, then a segregated phase or phases intimately dispersed therein. The bi- or multi-metal poly-metal hydroxides which form during the required digestion period of from about 10 minutes to about 48 hours (at a temperature in excess of the precipitation temperature of the metals as their metal hydroxides) are recovered in the layered form with a segregated phase of the metal hydroxide in excess of that required to form the layered structure.

The precursor is useful per se as a thickening agent for water or hydrophilic liquids or such liquids in combination with clays for use as drilling fluids and the like. However, if the initial ratio of metals is in the 1 to 2 range, the precursor is also useful to prepare the spinel of the metals; in fact, the closer to the 1 to 2 ratio overall the closer to the 1 to 1 ratio of layered hydroxide to segregated phase is, and the more perfect spinel structure is obtained. The use of compositions of the general nature here disclosed as thickening agents is set forth in detail in my co-pending application entitled "MIXED METAL HYDROXIDE-CLAY ADDUCTS AS THICKENING AGENTS FOR WATER AND OTHER HYDROPHILIC FLUIDS" Ser. No. 06/752,326, filed 7/5/85, now U.S. Pat. No. 4,664,843 issued by John L. Burba and Audrey L. Barnes, and "MIXED METAL HYDROXIDES FOR THICK- ENING WATER OR HYDROPHILIC FLUIDS" Ser. No. 752,325, filed July 5, 1985, by John L. Burba and Greene W. Strother.

An advantage of the present invention, in addition to the preparation of a precursor material free of chlorine/chloride, is that the alkali employed during the digestion and recovery of the precursor is not materially consumed. It appears that the caustic merely solubilizes some portion of each metal and during the digestion step, when the layered structure is formed in the soluble state of the reactants, it precipitates as a slurry and additional quantities of the starting materials solubilize forming in solution the layered structure which then precipitates until all of the lesser present metal(s) in the starting material are consumed. Thereafter, the greater present metal(s) will form the hydroxide and on completion of the digestion will precipitate, leaving the starting alkali concentration almost intact. Thus, one does not lose caustic and can employ the caustic solution is a cyclic process with very little make up.

A convenient technique for preparing the precursor compositions of the present invention is to prepare an aqueous slurry of the hydroxide, oxide or carbonate of one or more of a first metal or mixture of first metals with an alkali metal metal-oxide or metal hydroxide, e.g., sodium aluminate or aluminum hydroxide, or a mixture of two or more of such second metal(s) in proportions to provide on co-precipitation under basic conditions the desired layered structure crystal in which the metal, first group to second group, is in a ratio of 1 to 1, and when one or the other groups of metals is present in excess over this ratio in the starting mixture, a segregated phase in from 0 to about 3 ratios based on the layered ratio, intimately dispersed within the layered structure is formed. The mixture of starting material is generally a slurry maintained in suspension by stirring. During the digestion period, carried out at a temperature above about 40° C. preferably for between about 1 and about 24 hours, the metals go into solution or convert to the hydroxide form and combine into a lattice form which will, upon cooling to below about 40° C., precipitate in the layered structure. The preferred digestion temperature is above 40° C. and more preferably between about 100° and 150° C.

The concentration of the starting metal compounds is not critical and may be from about 1% to about their saturation concentration of the least soluble component when present in the ratio to provide at least a 1 to 1 ratio of the metals to form the layered structure up to the ratio to form the layered structure, and a segregated phase to form a spinel structure when heated. For example, if a magnesium aluminum spinel precursor is desired, then the controlling metal concentration is that of the aluminum, as for example, sodium aluminate, in order to provide the 2 aluminum to 1 magnesium ratio in the precursor as well as in the final oxide form.

The digestion time is dependent on the temperature, higher temperatures requiring shorter digestion periods.

The use of buffering agents such as sodium carbonate is often helpful but not necessary. The buffering agents give their usual tolerance for slight excesses of pH in either direction during digestion and co-precipitation. It is to be further understood that ammonium hydroxide may also be employed in part or in toto to maintain the appropriate pH for digestion and co-precipitation.

Metals which have been employed as components of spinels are metals such as lithium, calcium, strontium, zirconium, aluminum, cobalt, nickel, iron, magnesium and the like. These and other metals may be co-precipitated in accordance with the present invention to form useful thickening agents in the nature of my co-pending applications.

DETAILED DESCRIPTION OF THE INVENTION

In a representative example, 100 ml of a 17 normal $Mg(OH)_2$ (a brucite slurry) was mixed with a filtered 40% solution of $NaAlO_2$ and digested at 105° C. for 24 hours, and cooled to form the resulting suspension at 40° C. The precipitate was recovered by decanting the mother liquor from above the solids. The solids were dried at room temperature. The product analyzed by X-ray was a layered magnesium hydroxide/aluminum hydroxide crystal and a bayerite phase in the ratio of 1 to 1 with respect to the layered crystal structure. The product could be converted to a very pure reactive magnesium aluminum spinel ($MgAl_2O_4$ on heating to above about 500° C.) and a dense spinel on heating (calcining) to above 1000° C., and to a dense body on sintering above about 1400° C.

In another experiment about one equivalent of cobalt hydroxide ($Co(OH)_2$) was mixed with two equivalents of aluminum hydroxide ($Al(OH)_3$) and sufficient ammonium hydroxide was added to form the cobalt complex ($Co(NH_3)_6$) in the presence of sufficient sodium hydroxide to achieve a pH of about 10. The mixture was sealed in a glass container and placed in an oven. The mixture was digested with agitation to maintain the solids in suspension. The digestion period was about 16 hours. The resulting product was recovered, dried and analyzed by X-ray. The analysis showed a layered structure of a $CoAl(OH)_5$ plus $Al(OH)_3$ in a ratio of 1 to 1. On heating to above 500° C., the dried powder produced a finely divided powder having, by X-ray diffraction, a pattern indicating a spinel structure of $CoAlO_5$.

In still another experiment, calcium oxide (CaO) was mixed with sodium aluminate in the presence of sufficient sodium hydroxide to effectively solubilize some but not all of the two feeds. The suspension was maintained with stirring while the mixture was heated to about 90° C. for about 24 hours. Upon cessation of stirring and cooling to below about 40° C., a precipitate settled out. The X-ray analysis of the powder showed a layered crystalline structure of $CaAlO_4$ and a segregated phase of $Al(OH)_3$ in a ratio of about 1 to 1.

What is claimed is:

1. In a method of producing a substantially chlorine free bi- or multi-metal hydroxide precipitate as a layered structure in which the ratio of metals is at least 1 to 1 and when the ratio is greater than 1 to 1 such excess is a segregated phase of the hydroxide form of the metal(s) in the layered phase, consisting of mixing a first divalent metal or group of divalent metals as their insoluble hydroxide, oxyhydroxide or carbonate with a second metal or group of metals as their hydroxide or alkali metal oxide in a proportion and under aqueous alkaline pH conditions to form at least a layered structure after chemical digestion and precipitation of said metals as their hydroxides, said excess of metals over a 1 to 1 ratio forming a segregated phase of the hydroxide form of said metal or metals in excess, the concentration of the metals in the aqueous phase being from 1% by weight to about the saturation point of the least soluble of the metal starting compound such that the desired ratio is obtained based upon the amount of segregated phase desired, maintaining said mixture in suspension for from 10 minutes to about 48 hours at a temperature of above about 40° C., cooling said mixture to below about 40° C. and recovering the resultant precipitate, the resulting aqueous mother liquor being substantially free of precipitate and in which latter form is a suitable mother liquor, when by addition of alkali the pH is adjusted to that capable of providing an aqueous environment for precipitation of additional bi- or multi-metal layered structure compositions.

2. The product obtained in the method of claim 1 wherein the first metal is magnesium and the second metal is aluminum.

3. The product obtained in claim 2 wherein the ratio of the metals is such that that the layered phase to segregated phase is at least one to one.

4. The method of claim 1 wherein the temperature is between about greater than 40° C. and about 150° C.

5. The method of claim 1 wherein the concentration of the least soluble metal compound is between about 1 and about 20 percent by weight.

6. The method of claim 1 wherein the first metal is magnesium and the magnesium is employed as a 17N concentration.

7. The method of claim 1 wherein the second metal is aluminum and is present in the solution in a concentration of between about 1% by weight and the saturation concentration of aluminum in the mixture.

8. The method of claim 1 wherein the second metal is aluminum and the concentration of the aluminum is about 40%.

9. The method of claim 1 wherein the digestion period is between about 1 to about 24 hours.

10. The method of claim 1 wherein the first metal is calcium and the second metal is aluminum.

11. The method of claim 1 wherein the first metal is cobalt.

* * * * *